(12) United States Patent
Pettersson (10) Patent No.: US 7,051,283 B2
(45) Date of Patent: May 23, 2006

(54) PORTABLE ELECTRONIC APPARATUS AND METHOD FOR PROVIDING VISUAL AND/OR AUDIO INFORMATION

(75) Inventor: Jerry Pettersson, Skolgatan (SE)

(73) Assignee: IR Vision AB, Uppsala (SE)

( * ) Notice: Subject to any disclaimer, the term of this patent is extended or adjusted under 35 U.S.C. 154(b) by 231 days.

(21) Appl. No.: 09/814,774

(22) Filed: Mar. 23, 2001

(65) Prior Publication Data

US 2002/0041293 A1    Apr. 11, 2002

(30) Foreign Application Priority Data

Mar. 23, 2000   (DK)   ............................. 2000-00493

(51) Int. Cl.
*G06F 3/00*   (2006.01)

(52) U.S. Cl. ...................... 715/748; 715/840; 715/817; 715/779; 345/173

(58) Field of Classification Search ................ 345/835, 345/810, 825, 811, 812, 173, 828, 840, 779, 345/172, 168; 715/748, 840, 817

See application file for complete search history.

(56) References Cited

U.S. PATENT DOCUMENTS

| | | | |
|---|---|---|---|
| 5,086,385 A | | 2/1992 | Launey et al. ................. 700/83 |
| 5,694,150 A | * | 12/1997 | Sigona et al. ................ 345/856 |
| 5,831,699 A | * | 11/1998 | Wright et al. ................. 345/73 |
| 6,229,541 B1 | * | 5/2001 | Kamen et al. .............. 345/719 |

FOREIGN PATENT DOCUMENTS

EP    0675426    4/1995

* cited by examiner

*Primary Examiner*—Kieu D. Vu
(74) *Attorney, Agent, or Firm*—Birch, Stewart, Kolasch & Birch, LLP (57) ABSTRACT

A portable electronic apparatus and method for receiving information from a transmitter and providing the information to a user are disclosed. A display provides visual information to the user, and the visual information includes an image and at least one active area. At least one touch button is associated with the active area. A frame grabber, responsive to data received from the transmitter divides the data into a plurality of frames. A memory stores the plurality of frames into a hierarchy level sequence of memory frames. Each memory frame is uniquely identifiable and includes information portions corresponding to images, active areas and links. A controller identifies which information is to be displayed.

19 Claims, 5 Drawing Sheets

Fig. 3

PORTABLE ELECTRONIC APPARATUS AND METHOD FOR PROVIDING VISUAL AND/OR AUDIO INFORMATION

SUMMARY OF THE INVENTION

The present invention relates to an apparatus and a method for providing information and especially to how information is stored and grouped in order for it to be accessible using simple hardware—such as for use in portable equipment.

DESCRIPTION OF THE BACKGROUND ART

A number of portable electronic information providers exist which are able to store and provide information (visually and/or by audio)—but these normally comprise sophisticated hardware such as processors etc. Thus, such providers tend to be fragile in that such hardware is relatively fragile. Also, such hardware is expensive, whereby the providers will be relatively expensive.

Portable electronic information providers may be mobile telephones, laptop computers, and portable calendars.

It is an object of the present invention to provide an apparatus and a method, which may store and provide information units—preferably using much more simple hardware than software programmable general-purpose processors.

SUMMARY OF THE INVENTION

In a first aspect, the invention relates to an apparatus for providing information to a user, the apparatus comprising:
  means for providing visual information to the user, the information providing means being adapted to provide active areas of a user interface providing the visual information,
  means for storing a number of information units, each unit being uniquely identifiable and comprising:
    first information relating to a visual image to be provided by the providing means,
    second information relating to:
      which areas of the providing means are active during providing of the visual image by the providing means, and
      for each active area, third information relating to which information unit to provide on the providing means when the actual active area is activated,
  first means for identifying which information unit is to have its first information provided on the providing means, the identifying means being adapted to cause the providing means to provide the first information of the identified information unit,
  second means for identifying when an active area of the providing means has been activated during providing of the first information of an actual information unit,
  third means for identifying which active area of the providing means has been activated,
  altering means for, on the basis of the area identified by the third identifying means and the third information, of the actual information unit, relating to the identified activated area, having the identifying means subsequently identify the information unit relating to the third information of the actual information unit.

In the present context, an "information unit" comprises information sufficient for the user to understand the information of the visual image and therefrom to make a choice and select ("browse" or "surf" to) another information unit and another visual image. Preferably the visual image visually indicates, at areas of the providing means corresponding to areas thereof which are active when the information unit in question is provided, to the user where activation of the providing means will cause another information unit to be provided.

Also, the visual information will normally be an image digitised in order for it to be stored, retrieved and provided on the providing means. This image may be desired static in time or, as will be described further below, changing in order to provide e.g. video.

Preferably, the information providing means comprise a touch screen where the active areas are predefined areas thereof, a depression or touch of which by the user may be detected. A touch screen comprises means for identifying depression of an active area thereof and for identifying which area was activated.

Normally, the information units will be stored in a ROM, RAM, EPROM, EEPROM, hard disc or any other electronic storing means. Normally, any item of information or block or group of information will be represented therein by a unique address. Thus, the means for identifying which information unit is presently provided will preferably be adapted to represent the/an address of that information unit.

In this manner, an information unit will normally comprise information actually covering a number of addresses. However, an information unit may be said to have a single address, as all other parts thereof may have addresses relatively "positioned" and thus retrievable from the address of the information unit.

Activation of an active area of the providing means will cause the visual image of another information unit to be provided—an information unit having an address different from the actual one. Thus, the identifying means will, upon activation of the providing means, be caused to represent or read/determine the third information (relating to the activated area) of the actual information unit. If the identifying means control the providing means in the sense that the providing means provide the visual image of the information unit identified by the identifying means, an activation of an active area of the providing means will cause the visual image of the then selected information unit to be provided thereon.

Especially when the information units are stored in an identical, near-identical or similar manner, the controlling and data handling of the present apparatus may be performed without the use of a general purpose software controlled processor in that the providing of the first information of an information unit may simply be to read a predetermined number of bits/bytes either at the address of the information unit or a given offset therefrom. Also, the second information may be grouped into a variable number of units each representing an active area of the providing means.

In fact, one solution thereto will be that, upon activation of an active or activatable area, the altering means will search through the second information pertaining to the actual information unit—and if an area corresponding to an area of a second information corresponds to that activated, the altering means will cause the actual information unit to be replaced.

A preferred embodiment of the present invention is that described in Danish patent application No. PA 1999 01571. Thus, it is preferred that the apparatus further comprises means for receiving information units from an external source. Thus, the receiving means may comprise means for receiving information units transmitted using a wireless technology, such as via electromagnetic radiation, such as IR light, or radio waves.

In order to be able to have the information updated, the receiving means are preferably adapted to regularly, such as continuously, receive a number of information units and wherein the storing means are adapted to receive and store the received information units.

Also, the providing means may provide the first information of the actual information unit regularly. This is especially desired when the contents of the first information of the same information unit may change. One example of such an information unit is one wherein that unit represents e.g. a movie/video channel where the first information of the information unit represents the flow of images or frames of the movie/video. Under all circumstances, it is desired that the providing means provide the first information of the actual information unit with a predetermined frequency, such as at least once per minute, preferably at least once per second, such as at least 10 times each second, such as more than 25 times each second. Also, this updating of the first information may be independent of any updating—or frequency thereof—of the storing means.

Especially when one or more information units represent movie/video channels, it may be desired that all activatable areas of the providing means are active in order for the user to simply activate one area in order to leave the movie/video information and return to other information units in the apparatus. This also has the advantage that if merely a single area was active, this (normally the position thereof) should be brought to the attention of the user. A simple manner of doing this would be to demarcate that area on the providing means—but this would reduce/impair the image thereon during the video/movie.

In order to facilitate reception and storing of the information units, these are preferably stored consecutively in the storing means. If these are received from e.g. an external source, the information units are preferably stored in the order in which they were sent. In this manner, the external source may control the actual operation of the apparatus.

Preferably, neither of the first, second, third means, or the altering means comprise a software programmable general-purpose processor.

In a second aspect, the invention relates to a method of providing information to a user, the method comprising:
a) providing an information providing means for providing visual information to the user and being adapted to provide active areas of a user interface providing the visual information,
b) storing a number of information units, each unit being uniquely identifiable and comprising:
  first information relating to a visual image to be provided by the providing means,
  second information relating to:
    which areas of the providing means are active during providing of the visual image by the providing means, and
    for each active area, third information relating to which information unit to provide on the providing means when the actual active area is activated,
c) identifying which actual information unit is to have its first information provided on the providing means
d) providing the first information relating to the actual information unit on the providing means,
e) identifying when an active area of the providing means has been activated,
f) identifying which active area of the providing means has been activated,
g) on the basis of the area identified and the third information relating to the activated area and of the actual information unit, subsequently providing on the providing means the first information of an information unit relating to the third information of the actual information unit.

As described above, the method may further comprise, prior to step b), receiving the information units from an external source. Then the reception step may comprise receiving information units transmitted using a wireless technology, such as via electromagnetic radiation, such as IR light, or radio waves.

Also, the storing step—and alternatively also the receiving step—preferably comprises regularly, such as continuously, receiving a number of information units.

As described above, situations exist wherein step d) preferably comprises regularly, such as continuously, providing/updating the first information of the actual information unit on the providing means—and normally with a predetermined frequency as that mentioned above. Such updating may be performed independently of any updating of the storing means.

The storing step preferably comprises, for each information unit, identifying the first information and the individual second information "groups" relating to individual active areas, and relatively storing this information and these "groups" identically or similarly for all information units. In this manner, a very simple operation is required in order to actually provide the information of the information unit—and this operation is so identical or similar that it may actually be provided in relatively simple hardware—so as to avoid the use of software programmable general purpose processors.

Another manner of simplifying the operation of the apparatus is to store the information units consecutively in the storing means—and preferably, in the situation where the information are provided from e.g. an external source, in the order in which they were received. This has the advantage that the operation and surfing/shifting between information units may be fully controllable by the information units and the relative positioning/storing thereof.

Preferably, the information providing means is a touch screen having activatable, predefined areas thereof.

BRIEF DESCRIPTION OF DRAWINGS.

In the following, the preferred embodiment of the receiver, the KnowledgeMan, is described with reference to the drawings, wherein.

DETAILED DECRIPTION OF THE INVENTION

Transmitter

The transmission is performed using any suitable wireless communication. In this description we will concentrate upon infrared (IR) waves.

The IR transmitter is connected to a computer, an E-prom, or some other information source.

The information transmitted by the transmitter may vary and may depend on the so owner of the transmitter. Thus, this information may be more or less static pages or a combination of such pages and a continuous video/audio feed. Also, the transmitter may transmit information relating to the owner of the transmitter combined with information provided by a third party, which has leased part of the bandwidth of the system.

Transmission

Preferably, but not exclusively, the transmitted data is in analogue form and may contain text, pictures, video and audio. Using analogue transmission leads to an increased transmission rate and cost reductions. The present transmission rate is around 30 frames/sec.

Receiver

The receiver, in the present context termed "KnowledgeMan", comprises an IR receiver, a memory with a memory manager, a LCD display with a controller and a memory, and a touch screen.

Functions of the Receiver

In the following, the function of the receiver will be described closer with reference to FIGS. 2 and 3.

Figure 3:
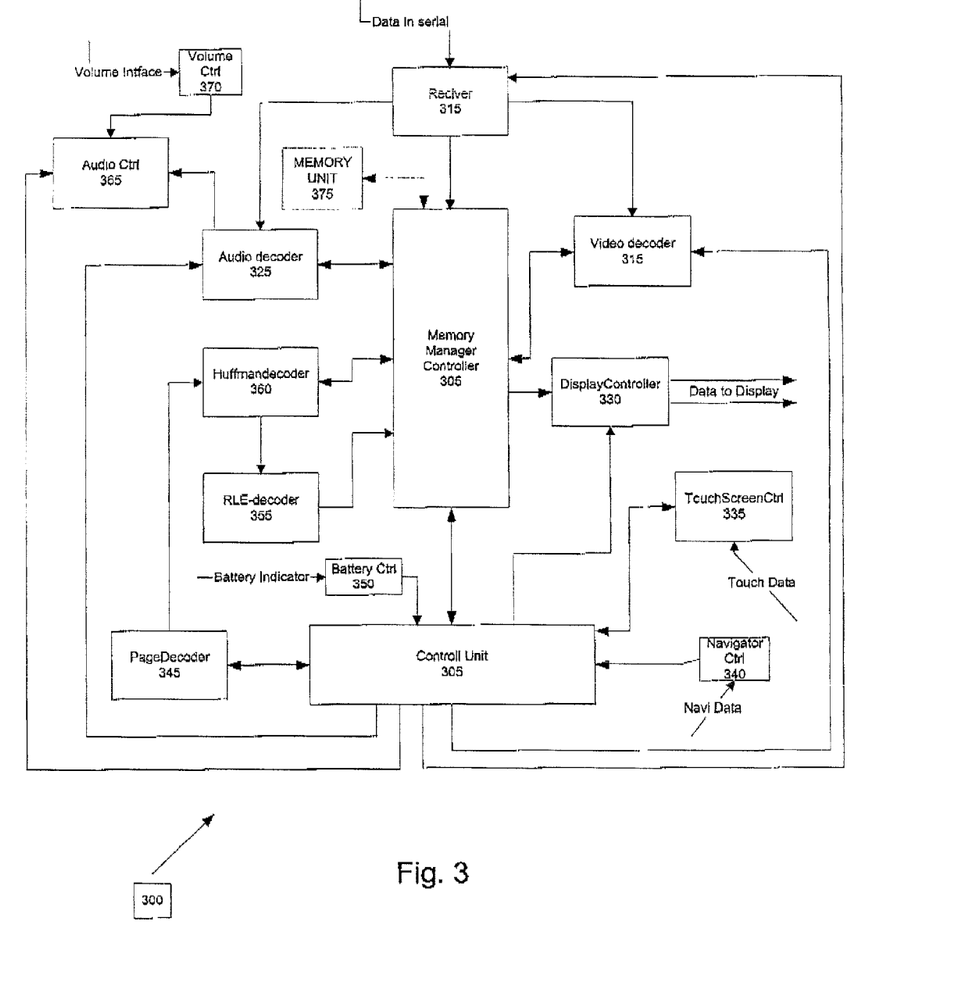
FIG. 3 illustrates an exemplary wiring diagram of the KnowledgeMan.

According to the wiring diagram of FIG. 3, the main circuitry 300, i.e. the part handling incoming and transferring data to the Memory Unit (MU) 375 comprises a Memory Manager Controller 305 (MMC), Controller Unit 310 (CU), receiver 315, Video Decoder 320 (VDC), Audio Decoder 325 (ADC), Display Controller 330 (DCT), Touch Screen Controller 335 (TSC), Navigator Controller 340 (NCT), Page Decoder 345 (PD), Battery Controller 350 (BC), RLE (Run Length Encoding) decoder 355 (RLED), Huffman Decoder 360 (HD), Audio Controller 365 (ACT) and Volume Controller 370.

The CU 310 is arranged to control the function of various units. Thus, it receives data from the TSC 335 and controls the MMC 305 and DCT 330 to output relevant information to the display driver (not shown). Based on the data send to the display, the TSC 335 is provided with the position of new push buttons.

The receiver 315 receives transmitted data and depending on the type of the received data and a control signal from the CU, the data is transmitted to the correct receiving unit, i.e. ADC 325, VDC 320 or MU. Data including image and/or audio information (video and/or audio streams) is usually sent to directly to the display via MMC to prevent unnecessary delays. However, both audio and video streams can be transferred to the memory for intermediate storage. Remaining data types are stored in the MU as described below.

Received and stored compressed data is decompressed by means of HD 360 and RLED 355 by input from PDC 345. Naturally, other compressions such as MPG, TIFF or any other sutiable copmlkoirersion may also be used NC 340 receives navigation data through the external device controllers and provides the CU with data, which generates control signals relating to on screen navigation.

VC and ACT control the audio volume output of the KnowledgeMan receiver.

Optionally, the BC 350 (an AID converter) is arranged to sense and indicate the battery level to the CU.

In most preferred embodiment, the Cu is arranged as a dynamic state machine; thus, the need for a convention, expensive programmable microprocessor is eliminated.

In most preferred embodiment of the invention, the circuitry 300 is arranged as on single circuit, and most preferably in single-chip technology.

A more general function description of the Receiver is as follows;

KnowledgeMan receives data through the memory manager and fills the memory. A certain protocol is used for packaging the transmitted data in order to unpack the received data.

Every information source has a start page showing the available subjects, which the user may select. This start page is grabbed by the LCD controller from the memory and is displayed on the LCD screen. At the same time the LCD controller sends information to the touch screen processor about how many touch screen buttons exist and where the are to be located on the LCD screen.

The user may now select the subject of interest. The touch screen controller sends information to the memory manager, which in turn selects the appropriate data from the memory and sends it further to the LCD controller and displays it on the screen as a new page. The touch screen processor is also updated with information about new touch bottoms.

This is the way the user may surf around the information available from one information source.

The transmission is in continuous mode, which means that the memory is updated all the time as long as the connection with the transmitter is on. When a disconnection appears, the receiver still has the stored data available for the user.

The user may also lock the receiver to a certain information source in order to avoid data from other information sources to be displayed on the LCD screen.

With a Halifax sensor it is also possible to display the direction in which the actual transmitter is located in order to get the optimal transmission coverage.

The receiver has full video and audio capacity. When receiving video information the memory manager transfers the information directly to the LCD display without using the memory.

In addition this more static way of displaying information, one page of the memory may receive e.g. video via the continuous updating of the memory. Choosing this memory will provide the user with a video feed for use e.g. in aeroplanes, trains or in cars. Preferably, in this situation, the KnowledgeMan will comprise means for outputting audio to e.g. a set of speakers or a set of headphones.

Components:

In the preferred embodiment, the specific components/ operations are:

Frame Grabber:

Divides the information sent in frames and stores the frames in the memory A frame is a complete page, which may be displayed on the LCD screen Memory:

Several subjects may exist from one information source. Each subject is defined in a hierarchy of frames/pages. The hierarchy is established by existing push bottoms in each frame where each push bottom represents a new frame. The frames are stored in hierarchy level sequence in the memory.

For example, we have three subjects (A, B, C) with the following structure of frames:

| Level 1 | A     | B      | C                  |
|---------|-------|--------|--------------------|
| Level 2 | A1, A2| B1     | C1, C2, C3         |
| Level 3 | A3.A4 | B2, B3 | C4, C5, C6, C7, C8 |

The storage sequence will then be:
ABCA1A2B1C1C2C3A3A4B2B3C4C5C6C7C8

The storing procedure then starts all over again. There are also several optimisation procedures defined in order to utilise the memory in the best way.

The memory may be expanded by e.g. providing a replaceable memory of any known type.

Preferably, the transmission data including different levels is transmitted with different rates. According to above example, it is possible to transmit level 1 data more frequent than level 2 data, and level 2 data more frequent than level 3 data and so on. However, this approach depends on the information importance, relevancy and accessibility to the user.

Memory Frame:

A memory frame comprises information that will be displayed and also information, which defines push bottoms and the position and area of each push bottom on the display. In addition, the frame contains links to the following frames on the next level in the hierarchy for one subject.

Frame Controller:

Fetches the next memory frame from memory, displays it on the LCD screen and gives the Touch screen the co-ordinates for the area of existing push bottoms in the frame.

Touch Screen:

Subsequent to an input, the touch screen tells the Frame controller what frame is to be displayed next.

LCD Screen:

Displays the actual frame.

Page Memory:

Remembers the last displayed frame number. If a disconnection appears this frame will be displayed.

Figure 1:
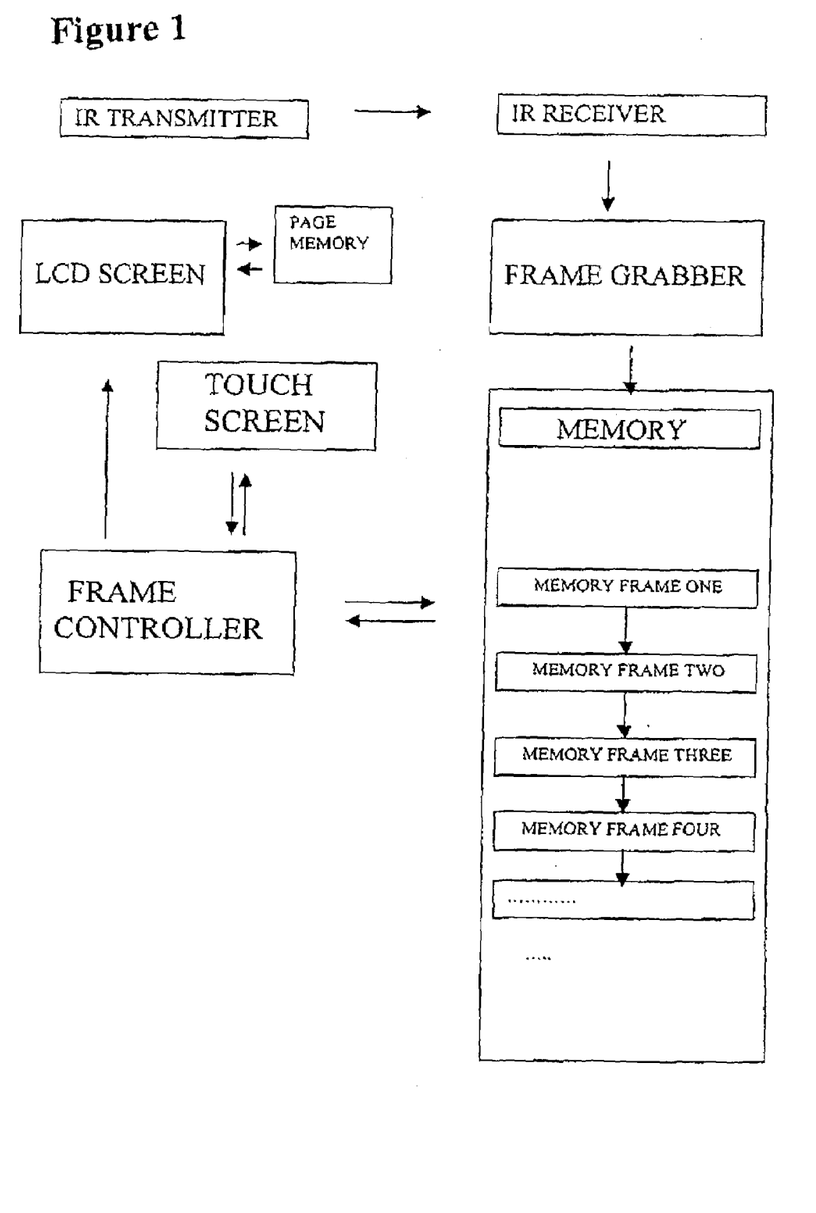
FIG. 1 illustrates the preferred hardware set-up and operation.

An example of the hardware set-up and the communication or operation thereof may be seen from FIG. 1.

Operation

Figure 2A:
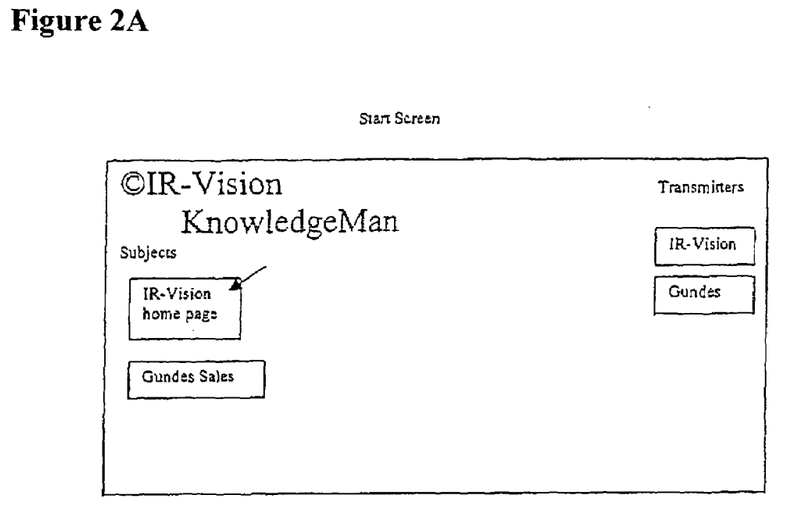
FIG. 2 illustrates how to navigate in the information received by the KnowledgeMan.
Figure 2B:
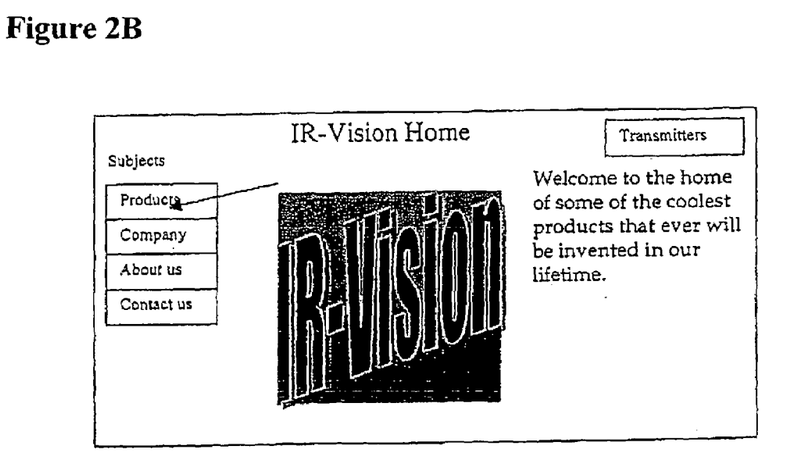
Figure 2C:
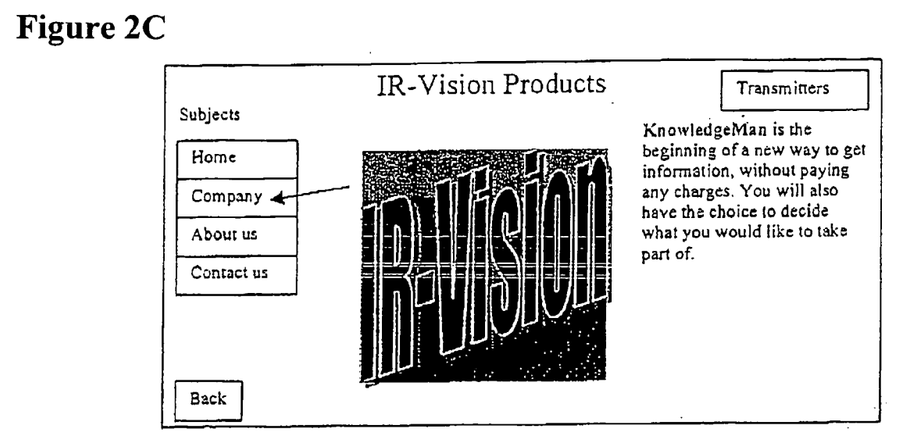
Figure 2D:
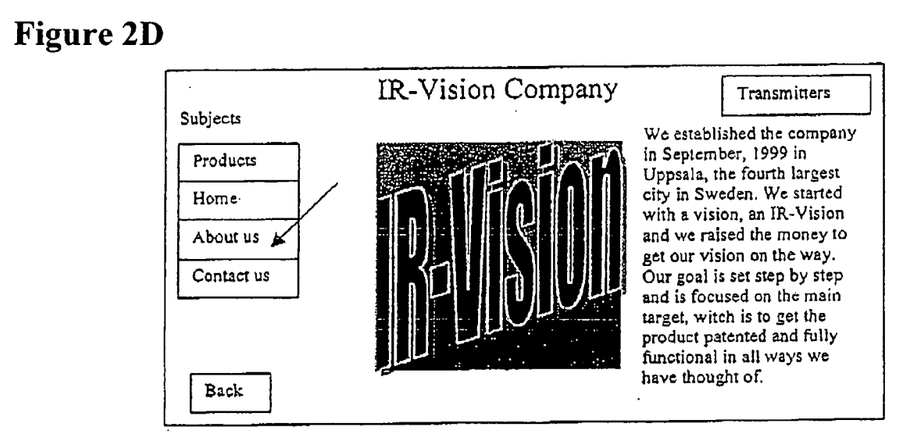
Figure 2E:
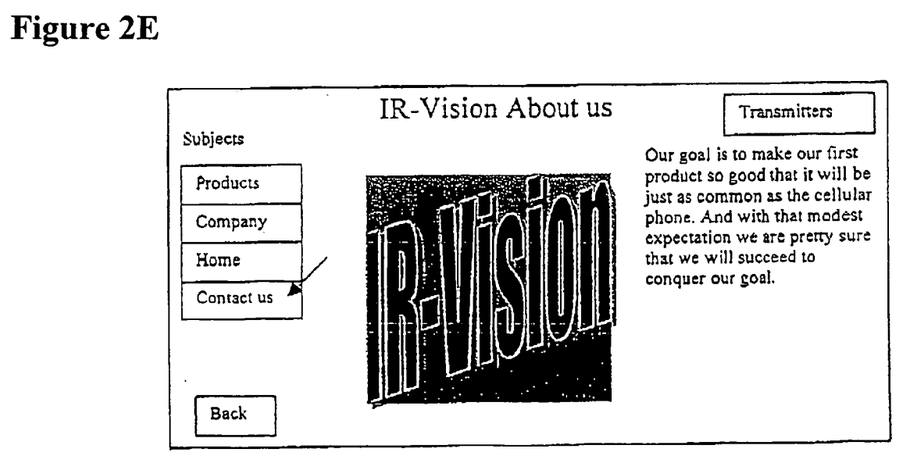
Figure 2F:
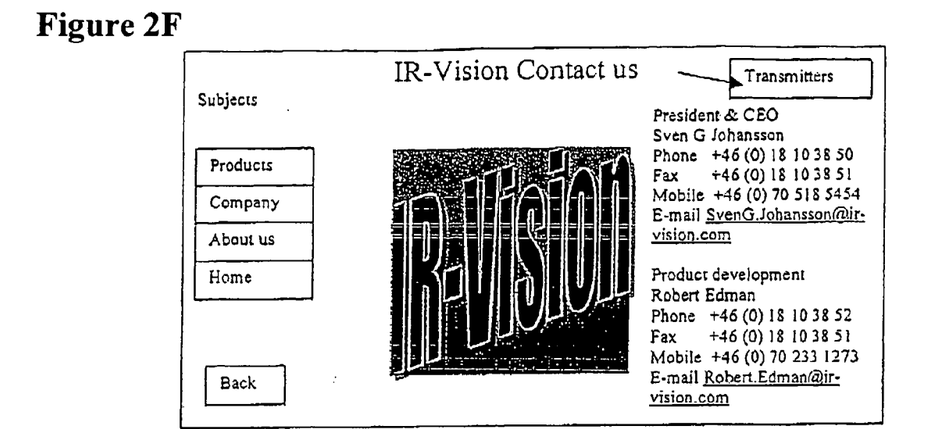
Figure 2G:
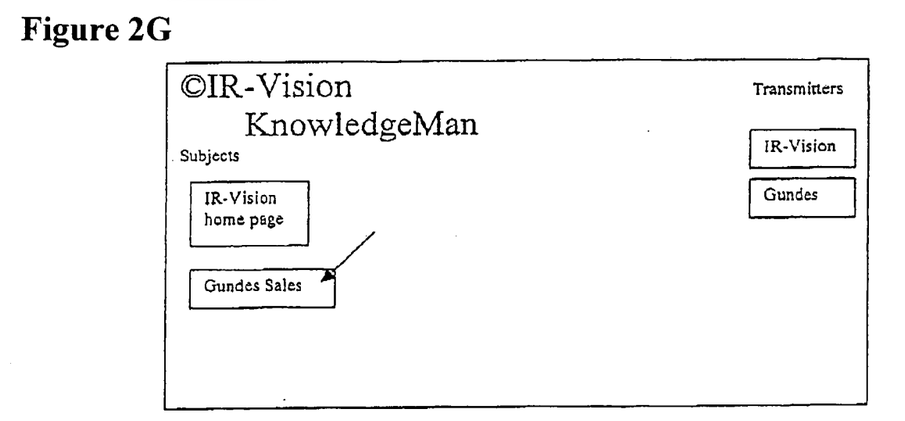
Figure 2H:
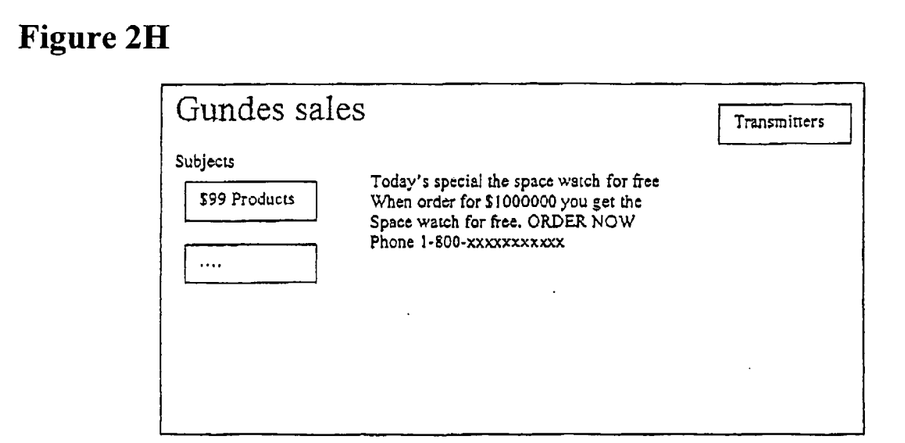

From FIG. 2, the manner of operation may be seen where FIG. 2A is the start received. This display provides a number of touch areas for the user to select between two transmitters and two subjects.

The individual illustrations of FIG. 2 illustrate how the selection of a given choice changes the information on the screen as well as the positions and contents/actions of the available push buttons on the screen.

It is seen that by pressing (transmitters), the available transmitters may be seen and any thereof may be selected in order to totally change the contents and information of the KnowledgeMan.

It is obvious that the invention is not limited to the illustrated and described embodiments and wiring diagram. Other embodiments comprising functional steps, means and functional units within the scope of the appended claims may also occur.

The invention claimed is:

1. An apparatus for receiving information from a transmitter and providing the information to a user, the apparatus comprising:
   a display for providing visual information to the user, the visual information including an image and at least one active area;
   at least one touch button associated with the active area;
   a frame grabber, responsive to data received from the transmitter, for dividing the data into a plurality of frames;
   a memory for storing the plurality of frames into a hierarchy level sequence of memory frames, wherein a hierarchy level of each memory frame corresponding to a transmission rate of the data, and each memory frame being uniquely identifiable and having:
      a first information portion corresponding to the image to be displayed on the display;
      a second information portion corresponding to the active area of the image and associated with the touch button; and
      a third information portion corresponding to a link to a different memory frame and associated with the active area of the image; and
   a controller for identifying which memory frame is to have its first information portion displayed on the display, for identifying when a touch button associated with the second information portion has been activated, and for identifying the third information portion associated with the activated touch button;
   wherein the apparatus displays a first image and at least one active area associated with a first memory frame, and when the touch button associated with the active area of the first memory frame is activated, the apparatus displays a second image and the active area associated with a second memory frame.

2. An apparatus according to claim 1, further comprising means for receiving information from an external source.

3. An apparatus according to claim 2, wherein the receiving means comprise means for receiving information transmitted using a wireless technology.

4. An apparatus according to claim 2, wherein the receiving means are adapted to receive information and wherein the memory is adapted to receive and store the received information.

5. An apparatus according to claim 1, wherein the providing means provides the first information portion of the actual information.

6. An apparatus according to according to claim 1, wherein the display comprises a touch screen where the active areas are predefined areas thereof, a depression or touch by the user is detected.

7. An apparatus according to claim 1, wherein the controller does not comprise a programmable microprocessor.

8. An apparatus according to claim 1, comprising a main circuitry for controlling received data, said main circuitry comprising a Memory Manager Controller, Controller Unit and a receiver.

9. An apparatus according to claim 8, further comprising a Video Decoder, Audio Decoder, Display Controller, and Touch Screen Controller.

10. An apparatus according to claim 8, further comprising an Audio Controller, a Volume Controller and a Navigator Controller.

11. An apparatus according to claim 8, further comprising a Page Decoder and data compression means.

12. An apparatus according to claim 8, wherein said Controller Unit is arranged as a dynamic state machine.

13. A method for receiving information from a transmitter and providing the information to a user, the method comprising the steps of:
providing visual information to the user on a display, the visual information including an image and at least one active area;
dividing data received from the transmitter into a plurality of frames;
storing the plurality of frames into a hierarchy level sequence of memory frames, wherein a hierarchy level of each memory frame corresponding to a transmission rate of the data, and each memory frame being uniquely identifiable and having:
a first information portion corresponding to the image to be displayed on the display;
a second information portion corresponding to the active area of the image and associated with a touch button; and
a third information portion corresponding to a link to a different memory frame and associated with the active area of the image; and
identifying which memory frame is to have its first information portion displayed on the display, identifying when a touch button associated with the second information portion has been activated, and identifying the third information portion associated with the activated touch button;
wherein a first image and at least one active area associated with a first memory frame are displayed, and when the touch button associated with the active area of the first memory frame is activated, a second image and the active area associated with a second memory frame are displayed.

14. A method according to claim 13, the method further comprising a receiving step for receiving the information from an external source.

15. A method according to claim 14, wherein the receiving step comprises receiving information transmitted using a wireless technology.

16. A method according to claim 13, wherein the storing step comprises storing information.

17. A method according to claim 13, wherein the memory frames are stored consecutively in storing means.

18. A method according to claim 13, wherein the first information portion is provided or updated.

19. A method according to claim 13, wherein the storing step comprises identifying the first information portion and individual parts of the second information portion relating to individual active areas, and storing the first information portion and the individual parts of the second information portion identically or similarly.

* * * * *